United States Patent Office 2,957,076
Patented Oct. 18, 1960

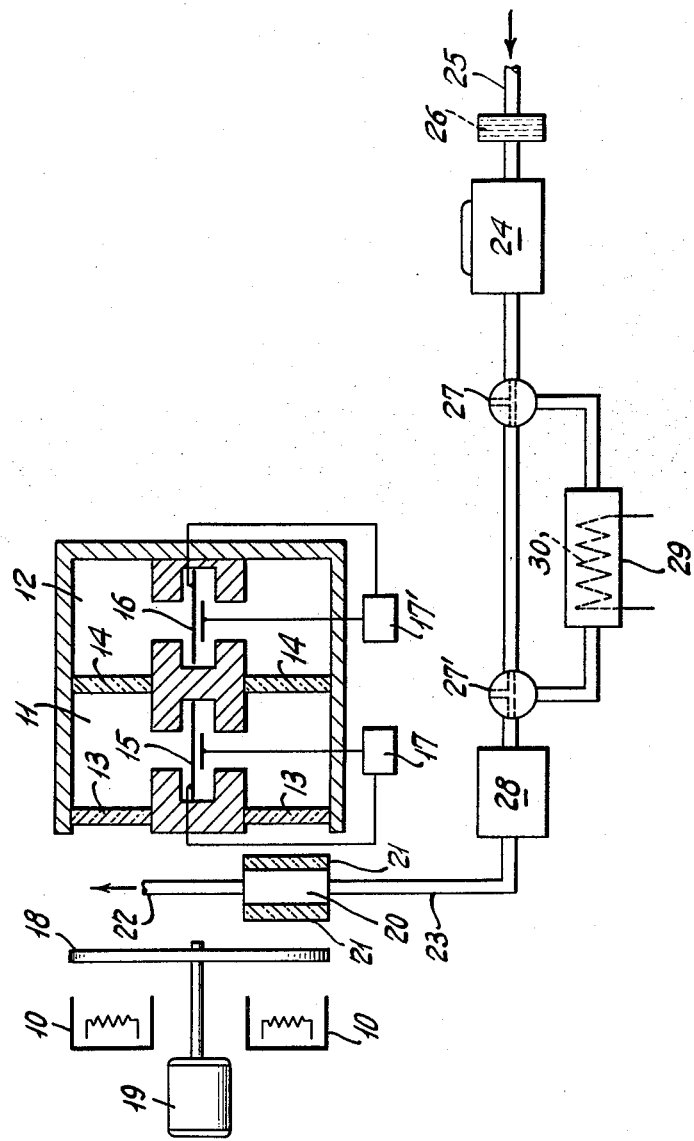

2,957,076

FUEL-AIR RATIO DETERMINATION BY INFRA-RED ANALYSIS OF EXHAUST GASES

Stanley A. Francis, Fishkill, N.Y., assignor to Texaco Inc., a corporation of Delaware Filed Aug. 29, 1957, Ser. No. 681,015

3 Claims. (Cl. 250—43.5)

This invention relates generally to a method of and apparatus for the analysis of exhaust gases, and specifically to the determination of fuel-air ratio by infra-red analysis of exhaust gases.

The present invention utilizes the principle used in the device disclosed by M. D. Liston in U.S. Patent No. 2,698,390, issued December 28, 1954, directed to the detection and measurement of substances selectively responsive to infra-red rays.

The absorption of particular wave lengths of radiation by various substances is known. Comparison of the effect of such radiation, e.g. infra-red rays, on a particular sample of a substance, and effect of the same radiation on the same sample after the radiation has been subjected to absorption in a sample of an unknown mixture, will reveal the presence (or absence) of the substance in the unknown mixture, and the amount of the substance in the sample of unknown mixture can be determined.

Accordingly, it is an object of my invention to provide a novel method for determining fuel-air ratio by analysis of exhaust gases.

It is another object of my invention to provide a novel method using infra-red rays to analyze exhaust gases in order to determine fuel-air ratio.

Still another object of my invention is to provide an improved apparatus for use in the determination of fuel-air ratio by the analysis of exhaust gases using infra-red rays.

These and other objects and advantages of the invention will become apparent by reference to the following description, when read in conjunction with the figure in the accompanying drawing showing a diagrammatic view of an infra-red gas analyzer with a sampling system as used herein.

The objects of my invention are accomplished by employing an apparatus which emits infra-red radiation which is subject to absorption during testing for CO and $CO_2$ content of exhaust gases.

The apparatus used in this invention consists basically of a pair of radiation sources at 10, 10, emitting radiation, such as infra-red rays, toward the test or detector chambers 11, 12 which contain samples of CO and $CO_2$ respectively. Each chamber is divided into two compartments which are separated by diaphragms 15, 16, these diaphragms being plates of condensers. The divided chambers have quartz windows, as at 13, 13 and 14, 14, which transmit the infra-red rays of the wave lengths absorbed by the contained test gases, viz. CO and $CO_2$. The condensers at 15 and 16 are connected to the indicating means at 17, 17' which consist of electronic devices capable of measuring and indicating on a meter, changes in capacity of the condensers. A rotatable shutter or light chopper 18, for interrupting simultaneously the radiation directed toward the chambers 11 and 12, is driven by the motor 19. A sample cell is disclosed at 20 having opposite faces of quartz, indicated at 21, 21, to allow radiation to pass through toward the detector chambers.

The principle of operation may be illustrated in the following manner. When energy is allowed to pass from the sources into the detector chambers, some of this energy is absorbed, the gas in the chamber heats up thus producing an increase in pressure. Since CO and $CO_2$ absorb different wave lengths of radiation, each detector chamber absorbs a different part of the energy and there is no hindrance by either detector of the absorption by the other detector. Since the rotating shutter interrupts the flow of energy to the detector chambers periodically, pressure pulses are produced in the chambers at this interruption frequency. When the sample chamber 20 contains no CO or $CO_2$, the pressure pulses on either side of the condenser plates 15 and 16 are the same and a zero reading is obtained at the indicating means 17 and 17'. If however the sample chamber contains some CO and $CO_2$, some of the energy which the gas in the detector chambers would have absorbed will be absorbed in the sample chamber. Less energy will then be absorbed in the lower compartments of the detector chambers and the pressure pulses in these compartments will be smaller than in the top compartments. As a result the diaphragms 15 and 16 will be displaced at the interruption frequency producing a change in capacity of the condensers at this frequency and thereby a deflection of the meter on the indicating means 17 and 17'. The relation between the meter deflection and the concentration of CO and $CO_2$ in the sample chamber can be established by calibration with mixtures of known CO and $CO_2$ content in the sample chamber. In analyzing unknown samples for CO and $CO_2$ content, the readings of the indicating means at 17 and 17' would be referred to this calibration curve to determine their CO and $CO_2$ content. The fuel-air ratio of a vehicle can be obtained from the CO and $CO_2$ readings by use of a conventional exhaust gas composition fuel-air ratio chart. Alternatively, the readings of the indicating means will give the fuel-air ratio directly if referred to a suitable calibration chart relating meter readings to fuel-air ratio for the particular C—H ratio of the fuel used.

Referring again to the drawing and the disclosure of the sampling system, cell 20 is shown discharging to the atmosphere at 22 at a point removed from the paths of the infra-red beams and joined at 23 to a pump and furnace assembly. The pump 24 draws in at intake 25 a sample taken from an auto engine exhaust pipe or smoke stack, which is passed through a filter 26 to remove soot and other foreign impurities. Depending on the setting of the three-way valves at 27 and 27', the sample is passed directly through a drying tube 28 for the removal of moisture before passing to the sample cell at 20. The three-way valves 27 and 27' may be turned to pass the sample of gas through the reaction chamber or combustion furnace 29, containing a platinum catalyst, in this case shown as a coil of wire, 30.

The method of this invention as practiced with the apparatus disclosed in the drawing includes the following steps. With the valves 27 and 27', set as shown, a sample of exhaust gas of unknown constituency with respect to the amounts of CO and $CO_2$, as well as unburned fuel, is passed to the cell 20 and analyzed to determine the actual content of CO and $CO_2$. This sample of exhaust gas contains a certain quantity of unburned fuel, the amount of which is necessary to know in order to determine the fuel-air ratio. In the apparatus as disclosed herein, the valves 27 and 27' are operated to pass another sample of the same portion of the exhaust gas from which the original sample was taken (although the same sample can be used), unchanged by any addition of air or other gas to reaction chamber 29, where it is subjected to catalytic conversion in the presence of a platinum catalyst, under conditions to react all unburned hydrocarbon fuel with $CO_2$ present in excess in the gas sample to form CO and hydrogen, a reversal of the familiar hycosynthesis reaction. After this reaction, the converted sample is subjected to infra-red analysis in order to determine the modified CO and $CO_2$ content, from which the actual unburned hydrocarbon content of the exhaust gas can be calculated and the fuel-air ratio determined.

Thus, there has been shown and described an improved method and apparatus for the determination of a fuel-air ratio by the infra-red analysis of exhaust gases, without necessity for the addition of extraneous gases to complicate the process and with but a simple sampling system used with an infra-red gas analyzer.

Obviously, many modifications and variations of the invention as hereinbefore set forth may be made without departing from the spirit and scope thereof and therefore only such limitations should be imposed as are indicated in the appended claims.

I claim:

1. A method for determining the amount of unburnt hydrocarbons in an exhaust gas mixture containing CO and $CO_2$ from which the fuel-air ratio can be determined which comprises passing infra-red radiation through a sample of said exhaust gas mixture, measuring the amount of energies absorbed by said mixture with respect to those wave lengths of radiation absorbed by CO and $CO_2$ thereby to determine the amounts thereof in said mixture, passing a sample from said exhaust gas mixture through a catalytic conversion chamber to react unburnt hydrocarbons therein with $CO_2$ present in excess in said sample to form CO and $H_2$, passing said infra-red radiation through the converted sample of exhaust gas mixture, and measuring the effect of the absorption of energies in those wave lengths of radiation peculiar to the presence of CO and $CO_2$ in order to determine the modified content of said last named gases, from which measuring the actual unburned hydrocarbon content of said exhaust gas mixture can be determined.

2. In the determination of a fuel-air ratio by analysis of an exhaust gas, the steps comprising passing infra-red radiation through a sample of exhaust gas containing unknown quantities of CO, $CO_2$ and unburnt hydrocarbons, detecting the effect of said radiation with respect to the absorption of said radiation peculiar to the presence of CO and $CO_2$ in said sample, passing a sample from the same portion of said exhaust gas through a catalytic conversion chamber in the presence of a platinum catalyst and under conditions to cause said unburnt hydrocarbons to react with $CO_2$ in excess in said sample to form CO and $H_2$, passing infra-red radiation through said sample of converted exhaust gas, and detecting the absorption effect on said radiation peculiar to the modified content of CO and $CO_2$, from which the actual content of unburnt hydrocarbons in said exhaust gas can be determined and the fuel-air ratio thereof determined from a fuel-air ratio chart.

3. The combination of an infra-red gas analyzer and exhaust gas sample conversion system for use in determination of a fuel-air ratio comprising paired sources of infra-red radiation, means for controlling the flow of said radiation, means responsive to said radiation including a pair of chambers each divided by a condenser structure and containing gases of known CO and $CO_2$ concentration and spaced in such respective order adjacent said paired sources of radiation and in alignment therewith, means joined to said condenser structure for indicating the effect of said radiation on the gases in said chambers, and a sample chamber for containing exhaust gas of unknown consistency interposed between one of said paired sources of radiation and said pair of chambers whereby the absorption of radiation by said exhaust gas in said sample chamber will affect the amount of radiation to be absorbed by the gases in said pair of chambers, said sample conversion system including means for providing directly to said sample chamber a sample of exhaust gas containing unburnt hydrocarbons, CO and $CO_2$, and a bypass structure for catalytic conversion of said unburnt hydrocarbons and $CO_2$ in excess in said sample to CO and $H_2$, said bypass structure having a reaction chamber with a platinum catalyst housed therein, and including valve means for selective flow control of a sample of exhaust gas through said reaction chamber prior to said sample chamber.

References Cited in the file of this patent

UNITED STATES PATENTS

| | | |
|---|---|---|
| 2,758,216 | Luft | Aug. 7, 1956 |
| 2,773,349 | Bollo et al. | Dec. 11, 1956 |
| 2,817,691 | Hutchins | Dec. 24, 1957 |

FOREIGN PATENTS

| | | |
|---|---|---|
| 645,576 | Great Britain | Nov. 1, 1950 |